United States Patent
Gallet

(10) Patent No.: US 9,856,825 B2
(45) Date of Patent: Jan. 2, 2018

(54) THRUST REVERSER DEVICE FOR COMPACT JET PIPE

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 763 days.

(21) Appl. No.: 14/236,498

(22) PCT Filed: Aug. 8, 2012

(86) PCT No.: PCT/FR2012/051862
§ 371 (c)(1),
(2), (4) Date: Jan. 31, 2014

(87) PCT Pub. No.: WO2013/021136
PCT Pub. Date: Feb. 14, 2013

(65) Prior Publication Data
US 2014/0150404 A1 Jun. 5, 2014

(30) Foreign Application Priority Data
Aug. 8, 2011 (FR) ..................... 11 57247

(51) Int. Cl.
F02K 1/00 (2006.01)
F02K 1/70 (2006.01)
F02K 1/72 (2006.01)

(52) U.S. Cl.
CPC . F02K 1/70 (2013.01); F02K 1/72 (2013.01)

(58) Field of Classification Search
CPC ..... F02K 1/09; F02K 1/70; F02K 1/72; F02K 1/763; F02K 1/766; F05D 2260/57
See application file for complete search history.

(56) References Cited

U.S. PATENT DOCUMENTS 5,655,360 A * 8/1997 Butler ............... F02K 1/72
239/265.29
6,256,980 B1 7/2001 Lecordix et al.
(Continued)

FOREIGN PATENT DOCUMENTS

EP 1 004 766 5/2000
FR 2 132 380 11/1972
(Continued)

OTHER PUBLICATIONS

International Search Report dated Oct. 12, 2012 in PCT/FR12/051862 Filed Aug. 8, 2012.

Primary Examiner — Jacob Cigna
Assistant Examiner — Lee A Holly
(74) Attorney, Agent, or Firm — Oblon, McClelland, Maier & Neustadt, L.L.P.

(57) ABSTRACT

A bypass turbojet engine nacelle that forms a fan casing includes a first, upstream, streamlining element and a second streamlining element that forms a jet pipe. The second element can move translationally between a position ensuring aerodynamic continuity of the nacelle and a downstream position uncovering flow reversal openings. A thrust reverser device is housed in the nacelle and includes flow reverser flaps and cascades of vanes providing radial guidance for the flow. The cascades of vanes providing radial guidance for the flow can move in translation along the axis of the nacelle between a retracted position into the first streamlining element and an active flow-guidance position, the second streamlining element being secured to the cascades of vanes, the reverser flaps being mounted to rotate about axes that are transverse with respect to the axis of the nacelle and secured to the cascades of vanes.

16 Claims, 4 Drawing Sheets

(56) References Cited

U.S. PATENT DOCUMENTS

| | | |
|---|---|---|
| 6,434,927 B1 | 8/2002 | Stretton |
| 2002/0124550 A1 | 9/2002 | Stretton |
| 2009/0151320 A1* | 6/2009 | Sternberger .............. F02K 1/72 60/226.2 |
| 2012/0228403 A1 | 9/2012 | Caruel et al. |
| 2014/0027537 A1* | 1/2014 | Binks ........................ F02K 1/09 239/265.35 |

FOREIGN PATENT DOCUMENTS

| | | |
|---|---|---|
| FR | 2 947 869 | 1/2011 |
| FR | 2 952 908 | 5/2011 |

* cited by examiner

THRUST REVERSER DEVICE FOR COMPACT JET PIPE

The present invention relates to a multi-flow turbojet engine, in particular a bypass engine, with separate flows, the cold flow forming an annular flow concentric with the primary flow and being ejected through a separate pipe from the primary flow. The invention relates more specifically to a thrust reverser fitted in the nacelle forming the fan envelope.

PRIOR ART

The current trend is to design engines with a high bypass ratio because they enable the power of the engines to be increased and the specific consumption to be improved. However, an increase in the bypass ratio is accompanied by an increase in the volume of the nacelle, in particular the volume of the fan streamlining element, and an increase in the drag produced thereby. These factors reduce the expected economies in consumption.

One solution to overcome this problem is to reduce the length of the part of the nacelle that constitutes the streamlining element for the bypass flow. This part is shorter, lighter and produces less drag. This is how ultra-short nacelles came to be proposed.

In this case, the problem of accommodating the thrust reverser for the bypass flow has to be solved, because the space available in the nacelle at the pipe element, downstream from the intermediate casing, is thus reduced. The known thrust reverser devices for the bypass flow are not compatible with ultra-short nacelles, in particular, because they comprise a whole system of connecting rods and thrust reverser cascades, which has to be accommodated in the pipe and which therefore requires a relatively long pipe.

Furthermore, for this type of engine, the section of the bypass flow stream emerging from the pipe is generally established in such a way as to maximise the output for an engine operating point; for example, an optimal exhaust section is chosen for cruising speed. It is known to improve engine performance over the entire range of operational speeds thereof with a pipe of variable section. However, producing a pipe of this kind with a variable section is complex and involves arranging within the nacelle a mechanism for actuating movable elements enabling the section thereof to be varied. This mechanism interferes with the mechanism of the thrust reverser device and the space that it occupies is additional to that occupied by the control for the bypass flow thrust reversers. The problem is particularly evident where there is a requirement to produce an ultra-short nacelle; the nacelle offers less space to accommodate the two mechanisms together.

DESCRIPTION OF THE INVENTION

The main aim of the invention is the arrangement of a thrust reverser mechanism which allows an ultra-short nacelle to be used.

The aim of the invention is also the arrangement of a mechanism for controlling the section of pipe associated with the arrangement of the thrust reverser mechanism.

These objectives are achieved with a nacelle of a bypass turbojet engine, the nacelle forming the fan envelope, comprising a first streamlining element, upstream, and a second streamlining element forming a pipe, the second element being movable in translation between an upstream position in which it ensures the aerodynamic continuity of the nacelle and a downstream position uncovering flow reversal openings, a thrust reverser device being accommodated in the nacelle and comprising bypass flow reverser flaps and also cascades for radial guidance of flow.

The nacelle is, according to the invention, characterised by the fact that the cascades for radial guidance of flow are movable in translation along the length of the axis of the nacelle between a position in which they are retracted into the first streamlining element and an active flow guidance position, the second streamlining element of the fan being integral with said guidance cascades, and by the fact that the reverser flaps are fitted so that they are movable in rotation around axes that are transverse relative to the axis of the nacelle and integral with the guidance cascades.

Whereas, in the prior art, the thrust reverser device is accommodated inside the movable element of the nacelle, this device is here accommodated in the first streamlining element and therefore, according to the solution of the invention, it is no longer necessary to reserve a volume of this kind inside the movable element of the nacelle. The movable element, in other words the second streamlining element forming a pipe, can be as short as required.

It is sufficient, in accordance with another feature, that the first, non-movable, streamlining element supports guide rails for the cascades, extending in a downstream direction. When the second movable element is in the upstream position, during a flight phase, it covers the guide rails which are thus contained inside the second movable element.

Preferably, the cascades and also the second streamlining element are integral with a synchronising ring perpendicular to the axis of the engine. The ring makes it possible to drive the whole via motor units fitted in the first streamlining element upstream.

The initiation of rotation of the reverser flaps can thus be controlled in accordance with the axial position of the cascades, retracted or deployed. More specifically, the reverser flaps are controlled in rotation by connecting rods accommodated in a first fan streamlining element.

These connecting rods are, according to one embodiment, fitted slideably parallel to the guide rails, one extremity of the connecting rods being articulated on the reverser flaps and the other extremity sliding in a housing of the first streamlining element of the nacelle. More specifically, when the cascade translates along the length of the rails, the connecting rods are guided in translation along the length of the guide rails, thus preventing the flaps from opening, and when the cascade reaches the limit of its travel, an arrangement drives their pivoting around an axis perpendicular to the guide rails, thus triggering the tilting of the reverser flaps into the flow diversion position. The bypass flow is diverted via radial guide cascades.

One advantage of the solution of the invention is that it allows control of the thrust reverser to be combined with variation of the section of the stream of air to be ejected. In this instance, the second element produces, with the streamlining of the central body of the turbojet, a variable section of flow depending on the position of the second streamlining element forming a pipe. To do this, all that is necessary is for the movable part to be covered sufficiently by the static part so that, over the first portion of the travel of the movable part, the pipe remains closed and does not supply the cascades.

Thus, the section of the stream of bypass flow increases when the second element is driven from its upstream position over a part of its movement in a downstream direction, the thrust reverser device being put in place when the second element forming a pipe continues its movement in a downstream direction.

DETAILED DESCRIPTION OF AN EMBODIMENT OF THE INVENTION

Figure 1:
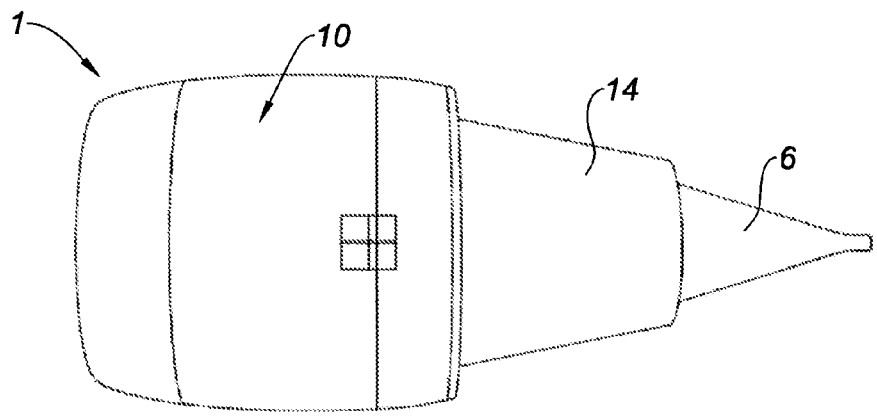
FIG. 1 shows the profile of a bypass gas turbine engine fitted with an ultra-short nacelle.

FIG. 1 shows an example of a bypass turbojet engine. It comprises an aerodynamic cylindrical envelope of the fan section that is hereinafter referred to as the nacelle 10 or fan nacelle. The cylindrical streamlining element for the primary flow that is referred to as the primary flow fairing 14 can be seen in this drawing, to the right of the nacelle 10; the streamlining element is smaller in diameter. The bypass flow is ejected into the atmosphere in the annular space arranged between the nacelle 10 and the central body. Downstream, the exhaust cone 6 delimits the annular stream of primary flow.

Figure 2:
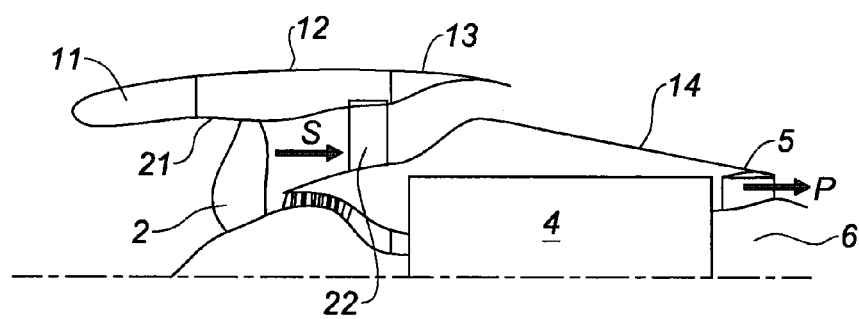
FIG. 2 shows the engine of FIG. 1 in longitudinal half-section.

FIG. 2 gives a partial view of the engine 1 in longitudinal half-section. The engine 1 comprises, from left to right, a fan 2 upstream, downstream from the element 11 of the nacelle 10 forming the air inlet. The air drawn in by the fan is separated into two concentric flows, primary P and bypass S. The primary air flow P is compressed again in order to be burned in a combustion chamber, and then reduced in pressure in one or more turbine stages which drive the compressor rotors including the fan 2. This part of the engine has not been detailed and has been represented by a single bloc 4. The primary flow is ejected into an annular primary flow pipe 5, downstream, along the length of an exhaust cone 6. A streamlining element forms the envelope of this part of the engine. This streamlining element is referred to as the primary flow fairing 14.

The mass of aspirated air then the bypass flow are confined in the fan casing 21. The bypass flow downstream of the fan passes through the arms of the intermediate casing 22 and the guide vanes if any and is then ejected directly into the atmosphere, along the length of the primary flow fairing 14. The nacelle 10 surrounds the fan casing 21 and the intermediate casing 22. The nacelle 10 is formed downstream of the air intake 11 of a first streamlining element 12 which extends along the length of the fan casing and of the collar of the intermediate casing 22. Downstream of the intermediate casing 22, the nacelle 10 comprises a second streamlining element 13. This second streamlining element 13 defines, with the primary flow fairing 14, the pipe for ejection of the bypass flow.

The engine is equipped with a thrust reverser device via which the bypass flow can be diverted radially and in an upstream direction so as to cancel the thrust and provide a reverse braking thrust for the aircraft when it is taxiing.

There are different devices that perform this function. The invention relates to a thrust reverser device comprising an element forming a bypass flow pipe movable in a downstream direction while deploying reverser flaps and opening passages along the length of the nacelle via which the flow blocked by the reverser flaps is diverted radially towards the outside of the engine; cascades are disposed in the openings to guide the flow.

Figure 3:
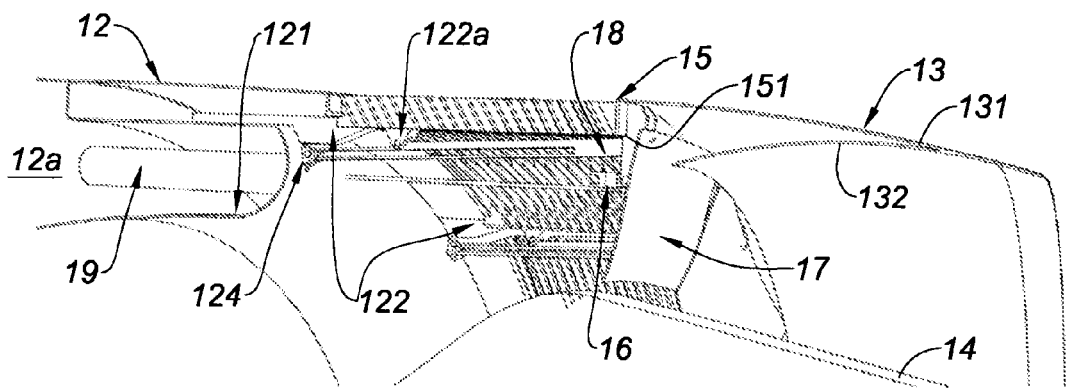
FIG. 3 is a perspective rear three-quarter view in cross-section of the thrust reverser in the active position.
Figure 4:
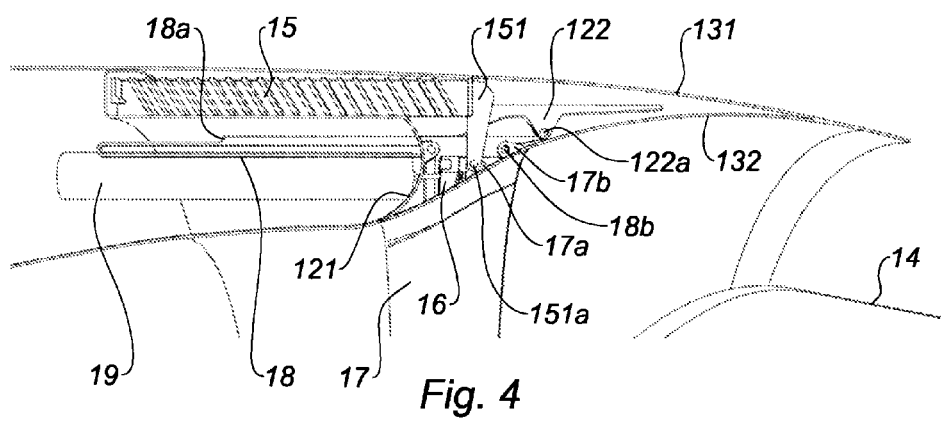
FIG. 4 is a view in cross-section of the reverser in the flight position.
Figure 5:
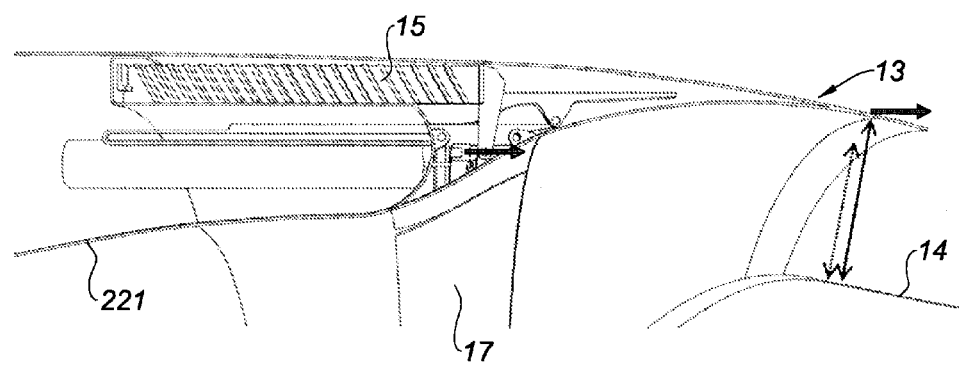
FIG. 5 is a view corresponding to that given in FIG. 4 and shows the direction of movement of the pipe elements to produce an increase in the exhaust section when the aircraft is in an approach phase of flight and on landing.

FIG. 3 shows the flow reverser device in the active position. FIGS. 4 and 5 show other details. The device comprises a cascade or a plurality of cascades 15, movable along the length of the internal wall of the first streamlining element 12, between a position in which it is completely retracted inside this first element 12 and the active position shown in the drawing. The cascade comprises radial vanes, incurved in an upstream direction, parallel to one another and spaced out from one another. Their function is to guide the flow that passes through the cascade radially and in an upstream direction.

A space 12a is arranged between the collar 221 of the intermediate casing (FIG. 5) and the streamlining element 12 to accommodate the thrust reverser units. The transverse wall connecting the first element 12 to the collar 221 delimits the upstream edge of the radial opening in the nacelle and forms the flow diversion edge 121.

This space also contains motor units 19 for operating the reverser; these can be actuators. The cascade 15 is guided in its movement from upstream to downstream by a plurality of guide rails 122. These rails extend from the diversion edge 121 parallel to the axis of the nacelle. The length of these rails corresponds to the maximum deployment distance of the cascade. The cascade comprises, for example, slides that bear on the rails along the length of its movement The cascade 15 comprises a plurality of radial fittings 151 at the extremity of which a synchronising ring 16 is fixed. This ring is perpendicular to the axis of the nacelle. The ring is connected to the movable rods (FIG. 4) of the motor units 19.

Reverser flaps 17 are fitted to and articulated on these fittings 151 or the synchronising ring. The flaps comprise yokes 17a traversed by shafts 151a, shown in FIG. 4, perpendicular to the axis of the nacelle, which also pass through the fittings. Thus, the flaps are able to pivot around the shafts 151a of the fittings 151 of the cascades 15.

The second streamlining element 13 is fixed to the cascade 15. Thus, when the cascade moves in translation, it carries with it the reverser flaps 17 and the second streamlining element 13. This element 13 comprises an external wall 131 and an internal wall 132. These two walls meet downstream to form the downstream edge of the nacelle.

The tilting of the flaps is controlled by connecting rods 18. The connecting rods extend parallel to the guide rails 122 along the length of and beneath said guide rails. The downstream extremity of the connecting rods is fixed to the flaps 17. The flaps comprise an internal yoke 17b situated downstream in relation to the yokes 17a. This yoke 17b is traversed by a shaft 18b which also traverses the downstream extremity of the connecting rods 18.

Figure 6:
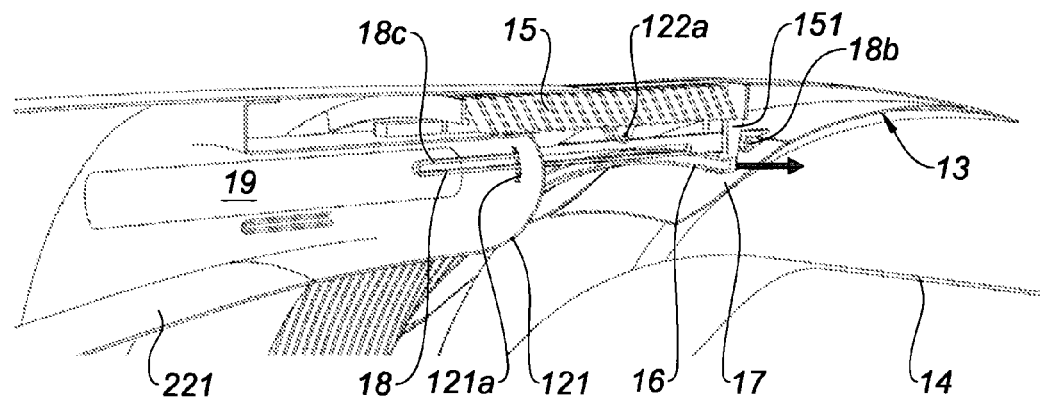
FIGS. 6, 7 and 8 are perspective front three-quarter views in cross-section, showing the deployment of the thrust reverser.

The upstream part of the connecting rods 18 comprises a slide 18c, shown in FIG. 6, in which there slides a stop pin 124 integral with the diversion edge 121, shown in FIG. 3. The connecting rods slide in a slit 121a arranged in the edge 121 and are stopped by the stop pin 124 when the latter reaches the limit of travel of the slide 18c.

The connecting rods 18 bear against a wheel 122a fixed to the lower edge of the guide rails 122. The wheels form outward stops for the connecting rods. The upper edge of the connecting rods in contact with the wheels comprises a notch 18a. The connecting rods are movable along the length of the rails. When the wheel 122a rolls between the notch 18a and the shaft 18b, it holds the connecting rod in position parallel to the rails. When the wheel is between the upstream extremity of the connecting rods 18 and the notch 18a, the connecting rod is free to tilt outwards. As the downstream extremity is connected to the flap 17, the connecting rod can pivot the flap outwards.

The operation of the reverser is described in relation to FIGS. 4 to 10.

The flight configuration can be seen in FIG. 4; the second streamlining element 13 is in the upstream position. The reverser is fully returned into the nacelle. The outflow section of the stream of air is at a minimum.

In FIG. 5, movement has been represented by arrows. The motor unit 19 pushes the synchronising ring 16 to the right and drives both the reverser and the pipe to the right. The flaps are still closed and the section of the pipe increases. The internal wall 132 and the wall of the fairing 14 are shaped for that purpose. This configuration corresponds to the phase of approach and landing of the aircraft.

In FIG. 6, the motor unit, the actuator 19, continues to push the ring 16. The connecting rod 18 is guided in translation along the length of the guide rails 122 by virtue of the fact that the wheel 122a bears against the upper face thereof. The flaps are prevented from opening.

Figure 7:
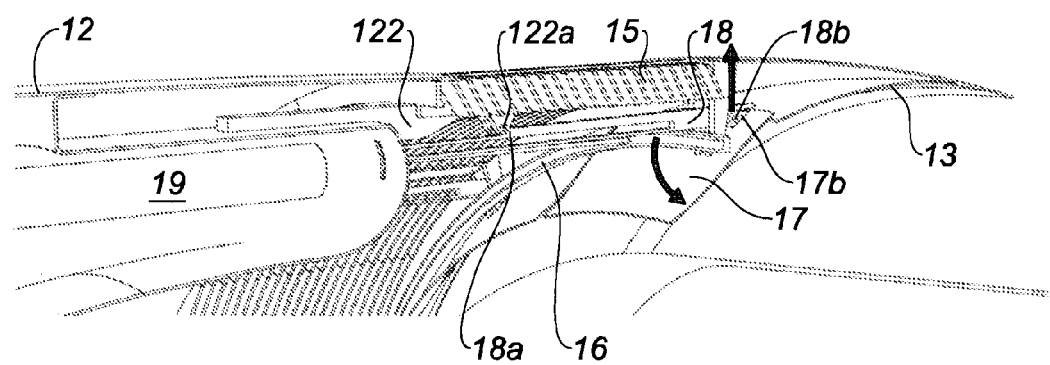

In FIG. 7, the connecting rod 18 comes to a stop on the stop pin 124, not shown in this drawing. It can no longer move to the right. As the notch 18a of the connecting rod has gone past the position of the wheel, the latter no longer bears against the upper face of the connecting rod 18. The connecting rod is therefore free to turn around the stop pin thus allowing the movement to open the flaps 17.

Figure 8:
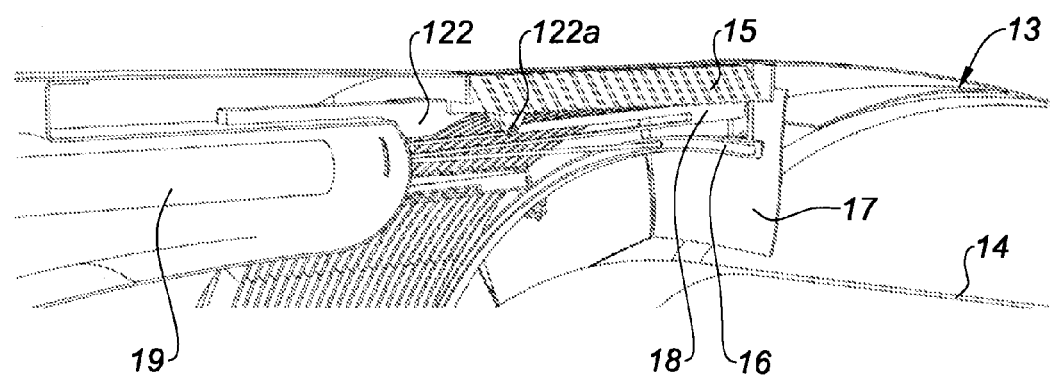

In FIG. 8, the reverser has emerged fully and the pilot of the aircraft can perform a go-around.

Figure 9:
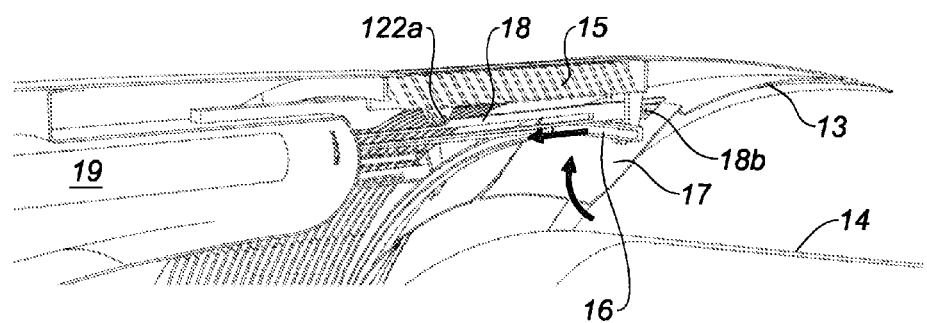
FIGS. 9 and 10 are perspective front three-quarter views in cross-section, showing the closure of the reverser.
Figure 10:
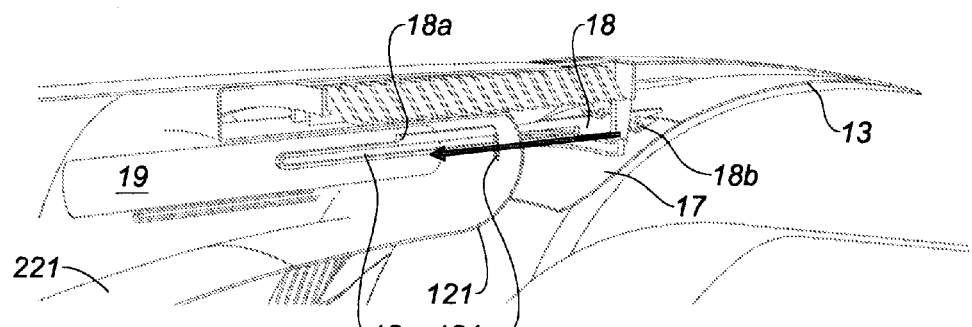

In FIGS. 9 and 10, the closure movement of the reverser is shown. The motor unit 19 draws the synchronising ring 16 to the left. The wheel 122a bears on the notch of the connecting rod 18 and prevents it from moving to the left. The flap therefore closes and the connecting rod moves to return to the horizontal. Once the connecting rod is horizontal, the flap is closed and the notch of the connecting rod is released from the wheel. The connecting rod can therefore move to the left and is guided in translation by the wheel which now bears on the upper face of the connecting rod.

By housing the mechanism in the first element of the nacelle, the invention has the advantage of freeing space inside the movable element forming the pipe. This movable element can thus be reduced.

The guidance of the connecting rod makes it possible to keep the flaps locked during the phase in which the section of the pipe is varied.

The invention claimed is:

1. A nacelle for a bypass turbojet engine, forming an envelope of a fan, comprising:
    a first streamlining element, upstream, and a second streamlining element forming a pipe, the second streamlining element being movable in translation between a position in which it ensures aerodynamic continuity of the nacelle and a downstream position uncovering flow reversal openings;
    a thrust reverser device accommodated in the nacelle and comprising bypass flow reverser flaps and cascades for radial guidance of flow,
    wherein the cascades for radial guidance of flow are movable in translation along a length of the axis of the nacelle between a position in which they are retracted into the first streamlining element and an active flow guidance position, the second streamlining element being integral with the cascades, and
    wherein the bypass flow reverser flaps are fitted to be movable in rotation around transverse axes that are transverse relative to the axis of the nacelle and that are fixed relative to the cascades, the reverser flaps being controlled in rotation by connecting rods having a first extremity articulated on the reverser flaps and a second extremity sliding in a housing of the first streamlining element.

2. A nacelle according to claim 1, wherein the first streamlining element comprises guide rails and the cascades bear against the guide rails to guide the cascades, extending in a downstream direction from an upstream edge of the first streamlining element.

3. A nacelle according to claim 1, wherein the cascades are integral with a synchronizing ring perpendicular to the axis of the engine.

4. A nacelle according to claim 1, wherein the cascades are set in movement in translation by a motor unit accommodated in the first streamlining element.

5. A nacelle according to claim 1, wherein the first streamlining element comprises guide rails for guiding the cascades, extending in a downstream direction from an upstream edge of the first streamlining element, and wherein the connecting rods are guided along a length of guide rails with an arrangement driving pivoting of the connecting rods around an axis perpendicular to the guide rails, and tilting of the bypass flow reverser flaps when the second streamlining element is at a given distance from the first streamlining element, in the downstream position uncovering the flow reversal openings.

6. A turbojet engine comprising a nacelle according to claim 1, wherein the second streamlining element, forming a pipe, creates with a primary flow fairing a flow section that is variable, as a function of an axial position of the second streamlining element.

7. A turbojet engine comprising a nacelle according to claim 1, the second streamlining element forming a pipe creating with a primary flow fairing a flow section that is variable, as a function of axial position of the second streamlining element, and a flow section of which increases when the second streamlining element forming a pipe is driven from its upstream position over a part of its movement in a downstream direction, the thrust reverser device being put in place when the second streamlining element forming a pipe continues its movement in a downstream direction.

8. A nacelle according to claim 1, wherein the cascades include radial fittings, the bypass flow reverser flaps include yokes, and the yokes are traversed by shafts that also pass through the fittings to pivotally attach the bypass flow reverser flaps directly to the cascades.

9. A nacelle according to claim 1, wherein the connecting rods include a shaft with a notch to control rotation of the bypass flow reverser flaps, the first streamlining element comprises guide rails to guide the cascades, and the guide rails include a wheel that rolls between the notch and the shaft of the connecting rods.

10. A nacelle according to claim 9, wherein the notch of the connecting rods does not extend along an entire length of the shaft such that, as the second streamlining element being moves towards the downstream position, the wheel exits the notch and the connecting rods tilt to pivot the bypass flow reverser flaps to the active flow guidance position.

11. A nacelle according to claim 9, wherein the connecting rods extend parallel to the guide rails.

12. A nacelle according to claim 2, wherein the connecting rods extend parallel to the guide rails.

13. A nacelle according to claim 1, wherein the second extremity of the connecting rods extends into the housing that forms an upstream edge of the flow reversal openings, each of the connecting rods including a stop pin to prevent the second extremity from traveling downstream of the housing.

14. A nacelle according to claim 1, wherein the bypass flow reverser flaps are directly attached to the cascades such that the bypass flow reverser flaps pivot around the cascades.

15. A nacelle according to claim 1, wherein the transverse axes are constituted by shafts the pass through fittings that are integral with the cascades.

16. A nacelle according to claim 1, wherein the second extremity of the connecting rods is at an upstream part of the connecting rods that comprises a slide adapted to slide relative to a stop pin, said stop pin being integral with a flow diversion edge of the first streamlining element.

\* \* \* \* \*